United States Patent
Schmelz et al.

(10) Patent No.: US 11,012,307 B2
(45) Date of Patent: May 18, 2021

(54) NETWORK ENTITY AND METHOD FOR CONTROLLING A SON-FUNCTION

(71) Applicant: NOKIA SOLUTIONS AND NETWORKS OY, Espoo (FI)

(72) Inventors: Lars Christoph Schmelz, Haar (DE); Christoph Frenzel, Munich (DE); Simon Lohmueller, Augsburg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 140 days.

(21) Appl. No.: 14/893,983

(22) PCT Filed: May 28, 2014

(86) PCT No.: PCT/EP2014/061088
§ 371 (c)(1),
(2) Date: Nov. 25, 2015

(87) PCT Pub. No.: WO2014/191469
PCT Pub. Date: Dec. 4, 2014

(65) Prior Publication Data
US 2016/0134478 A1 May 12, 2016

Related U.S. Application Data

(60) Provisional application No. 61/828,346, filed on May 29, 2013.

(51) Int. Cl.
*H04L 12/24* (2006.01)
*H04W 24/10* (2009.01)
*H04W 84/18* (2009.01)

(52) U.S. Cl.
CPC ......... *H04L 41/0886* (2013.01); *H04W 24/10* (2013.01); *H04W 84/18* (2013.01)

(58) Field of Classification Search
CPC .... H04W 24/10; H04W 84/18; H04L 41/0886
See application file for complete search history.

(56) References Cited

U.S. PATENT DOCUMENTS

2005/0055440 A1* 3/2005 Marilly ................ H04L 12/14
709/224
2012/0059923 A1* 3/2012 Cleary ................. H04W 24/00
709/223

(Continued)

FOREIGN PATENT DOCUMENTS

| CN | 101119308 A | 2/2008 |
|---|---|---|
| CN | 102056206 A | 5/2011 |
| WO | WO 2012/143055 A1 | 10/2012 |

OTHER PUBLICATIONS

International Search Report and Written Opinion dated Oct. 2, 2014 corresponding to International Patent Application No. PCT/EP2014/061088.

(Continued)

*Primary Examiner* — Chi Ho A Lee
(74) *Attorney, Agent, or Firm* — Squire Patton Boggs (US) LLP (57) ABSTRACT

The invention relates to a network entity installed in a network comprising an operator objective interface for receiving operator objectives; a SON-Function model interface for receiving at least a first SON Function Model, wherein the network entity is adapted to link the operator objectives with the first SON-Function model in order to adapt a SON Function for influencing a network behavior. Moreover the invention relates to a method for automatic controlling of at least one SON Function.

17 Claims, 8 Drawing Sheets

(56) References Cited

U.S. PATENT DOCUMENTS

| | | | | |
|---|---|---|---|---|
| 2013/0294286 A1* | 11/2013 | Schmelz | ............... | H04W 24/02 370/254 |
| 2013/0331079 A1* | 12/2013 | Racz | .................... | H04W 24/02 455/418 |
| 2014/0293831 A1* | 10/2014 | Han | .................... | H04L 41/0866 370/254 |
| 2014/0293979 A1* | 10/2014 | Gormley | ............... | H04W 24/02 370/338 |
| 2014/0301277 A1* | 10/2014 | Ueda | .................... | H04W 24/02 370/328 |
| 2015/0031354 A1* | 1/2015 | Nuss | ....................... | H04L 41/08 455/424 |
| 2015/0043386 A1* | 2/2015 | Racz | .................... | H04L 41/044 370/255 |
| 2015/0043432 A1* | 2/2015 | Zou | ....................... | H04W 24/02 370/328 |
| 2015/0271025 A1* | 9/2015 | Yao | ....................... | H04W 24/02 370/241.1 |
| 2015/0382209 A1* | 12/2015 | Sanneck | ............... | H04W 24/10 370/252 |

OTHER PUBLICATIONS

Neil Scully et al., "Measurements, Architecture and Interfaces for Self-organising Networks," Internet Citation, Oct. 31, 2010, pp. 1-47, XP002625808, Retrieved from the Internet: http://www.fp7-socrates.eu/files/Deliverables/SOCRATES_D5.10%20Measurennents,%20architecture%20and%20interfaces%20 for%20self-organising%20networks.pdf.

3GPP TS 32.521 V11.1.0 (Dec. 2012); 3rd Generation Partnership Project; Technical Specification Group Services and System Aspects; Telecommunication Management; Self-Organizing Networks (SON) Policy Network Resource Model (NRM) Integration Reference Point (IRP); Requirements (Release 11).

3GPP TS 32.522 V11.5.1 (Mar. 2013); 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11.

A. K. Bandera, et al.; „A Goal-based Approach to Policy Refinement; Proceedings 5th IEEE Workshop on Policies for Distributed Systems and Networks (Policy 2004); New York, USA, Jun. 2004.

A. Galani, et al.; „A Policy based Framework for governing Future Networks; The 4th IEEE International Workshop on Management of Emerging Networks and Services; Anaheim, California, USA, Dec. 2012.

R. Romeikat, et al.; „Automated Refinement of Policies for Network Management; 17th Asia-Pacific Conference on Communications (APCC 2011); IEEE, pp. 439-444, Kota Kinabalu, Malaysia, Oct. 2011.

S. van der Meer, et al.; Autonomic Networking: Prototype Implementation of the Policy Continuum; Proceedings of the 1st IEEE International Workshop on Broadband Convergence Networks (BcN), Vancouver, Canada, 2006.

UniverSelf Case Study—Part I: "SON and SON collaboration according to operator policies"; EU FP7 UniverSelf project, Sep. 2012, 15 pages.

UniverSelf Deliverable D2.2; "Unified Management Framework (UMF) Spcifications"; Release 2; EU FP7 UniverSelf project, Oct. 2012, 123 pages.

Chinese Office Action corresponding to Application No. 201480042970.6, dated Jan. 4, 2019.

Third Office Action issued in corresponding Chinese Patent Application No. 201480042970.6, dated Jul. 3, 2019.

Chinese Office Action issued in corresponding Chinese Patent Application No. 201480042970.6 dated Apr. 25, 2018.

* cited by examiner

NETWORK ENTITY AND METHOD FOR CONTROLLING A SON-FUNCTION

TECHNICAL FIELD

The invention relates to communication networks and especially to Self-Organizing Networks (SON). In particular the invention relates to a network entity and to a method for automatic controlling of at least one SON Function. Furthermore, the invention relates to a program element and to a computer-readable medium.

BACKGROUND

Self-Organizing Networks (SON) describe a management approach for mobile networks where a set of independently acting SON Functions aim at the automation of dedicated network management tasks. These tasks may include network optimization, network configuration and failure recovery. Each SON Function thereby may represent a closed control loop, which may aim at optimization of dedicated Key Performance Indicators (KPIs) in the network. Such KPIs may include for example a call drop rate, a handover success rate and/or a cell load. The optimization may be provided in the network through an adjustment of Network Configuration Parameters (NCP), such as for example a base station transmission power, a cell individual offset, a handover hysteresis, a time-to-trigger, etc. At present SON Functions are executed with default (e.g., manufacturer default, or operator default) configuration parameter values (SCV), since a manual adaptation seems to be not very suitable, as it requires considerable efforts and extensive operational knowledge to adjust the needs in a network during operation.

Figure 1:
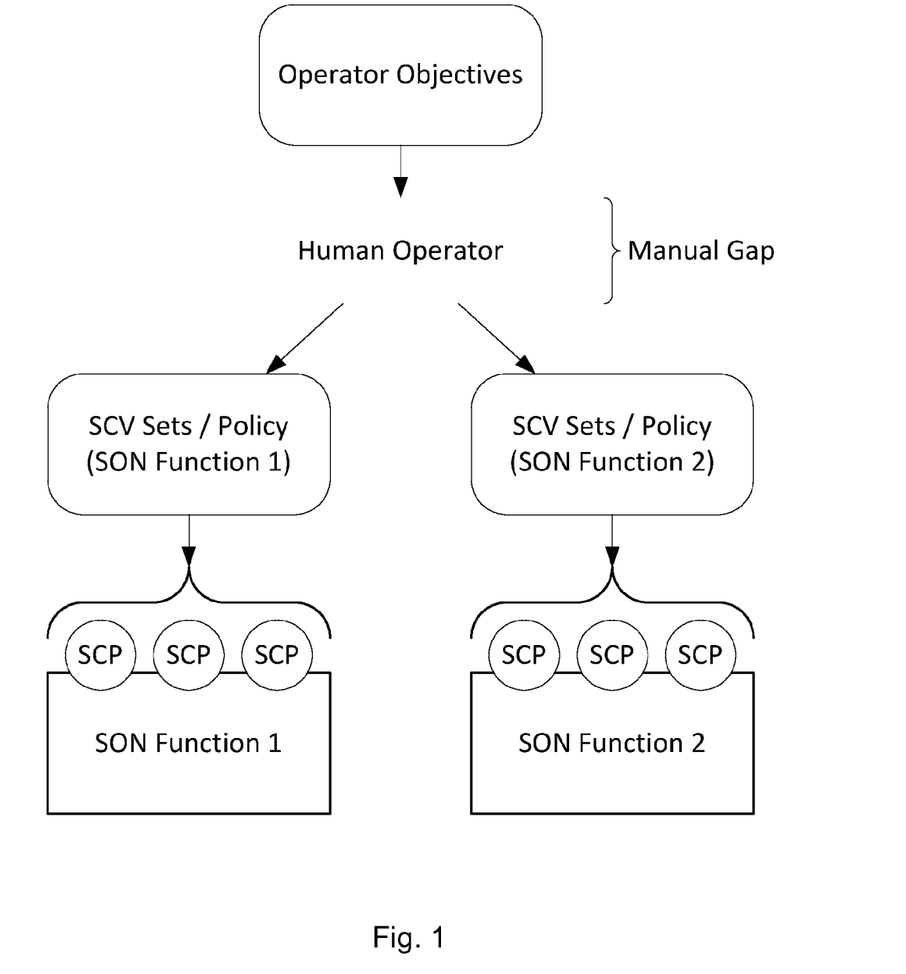
FIG. 1: an exemplary embodiment of a known SON Management environment.

At present there occurs a problem to adapt SON Functions according to individual objectives of a network operator, which is in current systems to be performed manually (manual gap, as it is displayed in FIG. 1). Thus, there may be a need to provide an automated solution in order to improve or avoid manual adaptations in a network in relation to SON Functions, and to avoid complications that come along with such manual adaptations.

SUMMARY

According to one first aspect of the present invention there may be provided a network entity.

According to a second aspect of the present invention there may be provided a method for adapting a SON Function.

According to a third aspect of the present invention there may be program element.

According to a fourth aspect of the present invention there may be provided a computer-readable medium.

Figure 2:
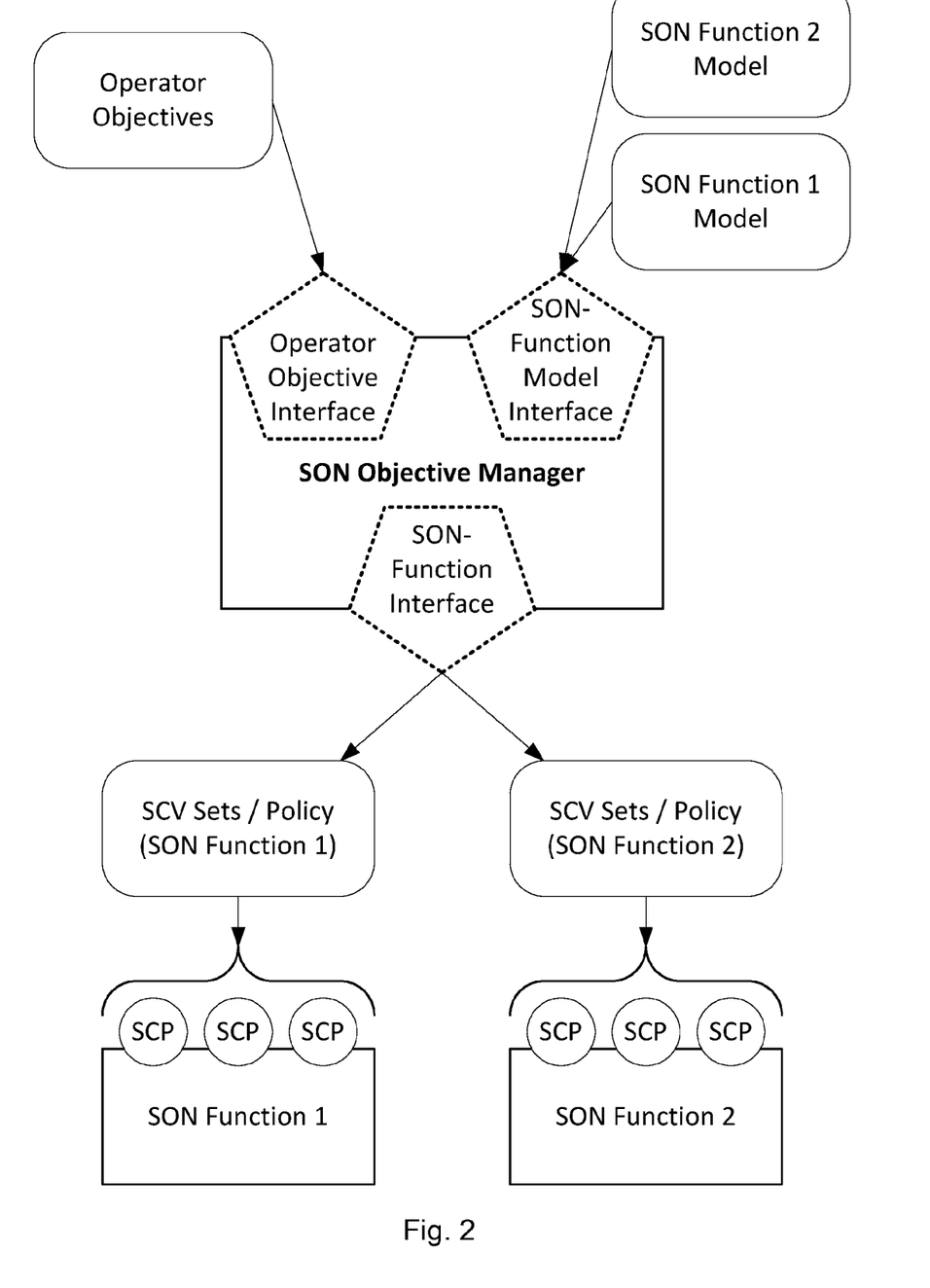
FIG. 2: an exemplary embodiment of a SON Objective Manager with interfaces, input/output data, and target SON Functions.

In order to solve the problem described above, a component which connects operator objectives with SON Function Configuration Parameter Values SCVs, called SON Objective Manager, may be proposed, which closes the manual gap of SON Management by automatically deriving the SCVs from operator objectives with the help of SON Function models as illustrated in FIG. 2, which will be described later on.

According to an exemplary embodiment of the present invention there may be provided a network entity installed in a network comprising
   an operator objective interface for receiving operator objectives;
   a SON-Function model interface for receiving at least a first SON Function Model;
   wherein the network entity is adapted to link the operator objectives with the first SON-Function model in order to adapt a SON Function for influencing a network behavior.

According to an exemplary embodiment of the present invention there may be foreseen that the SON Function Model comprises at least one SON-Function Configuration Parameter Value, and comprises at least one operator objective, and can comprise at least one condition.

According to an exemplary embodiment of the present invention there may be foreseen that the operator objectives are business policies, or strategic policies, or technical policies, that can comprise conditions, and that can comprise priorities.

According to an exemplary embodiment of the present invention there may be foreseen that the network entity is adapted to transform operator objectives into configuration values and/or policies and/or SCV Sets that can be executed by a SON Function.

According to an exemplary embodiment of the present invention there may be foreseen that the network entity comprises a SON-Function Interface for connection with at least one SON Function.

According to an exemplary embodiment of the present invention there may be provided a method for automatic controlling of at least one SON Function, the method may comprise
   receiving at least one SON-Function Configuration Parameter Value from a SON Function Model;
   receiving at least one operator objective;
   automatically mapping the SON-Function Configuration Parameter Value with the operator objective;
   providing configuration values and/or policies and/or SCV Sets for a SON Function to be executed by the SON Function.

According to an exemplary embodiment of the present invention the method may further comprise
   receiving conditions from a SON Function Model;
   automatically mapping the SON-Function Configuration Parameter Value with the operator objective, depending on conditions.

According to an exemplary embodiment of the present invention the method may further comprise
   receiving conditions from an operator objective;
   automatically mapping the SON-Function Configuration Parameter Value with the operator objective, depending on conditions.

According to an exemplary embodiment of the present invention the method may further comprise
   receiving priorities from an operator objective
   automatically mapping the SON-Function Configuration Parameter Value with the operator objective, depending on conditions, or depending on priorities, or depending on conditions and priorities.

According to an exemplary embodiment of the present invention the method may further comprise
   generating at least one SCV set for the SON Function.

According to an exemplary embodiment of the present invention the method may further comprise
   dynamically configuring the SON Function.

According to an exemplary embodiment of the present invention the method may further comprise
   determining relevant system state regions where a SCV set or operator objectives have to be changed.

According to an exemplary embodiment of the present invention the method may further comprise
utilizing operator objectives to adapt SCPs of a SON Function.

According to an exemplary embodiment of the present invention the method may further comprise
utilizing configuration data for adapting the SCPs of a SON Function.

According to an exemplary embodiment of the present invention the method may further comprise
utilizing policies for adapting the SON Function.

According to an exemplary embodiment of the present invention there may be provided a program element, which, when being executed by a processor, is adapted to control or carry out a method according to at least one embodiment of the present invention.

According to an exemplary embodiment of the present invention there may be provided a computer-readable medium, in which a computer program may be stored which, when being executed by a processor, is adapted to control or carry out a method according to at least one embodiment of the present invention.

The aspects and exemplary embodiments defined above and further aspects of the invention are apparent from the example of embodiment to be described hereinafter and are explained with reference to these examples of embodiment. It should be understood that features described for the network entity may be also utilized for performing the method according to the invention.

BRIEF DESCRIPTION OF DRAWINGS

Embodiments of the present invention are described below with reference to the accompanying drawings, which are not necessarily drawn in scale, wherein the following Figures show.

DETAILED DESCRIPTION OF EXEMPLARY EMBODIMENTS

FIG. 1 shows an exemplary embodiment of a known SON Management environment where operator objectives (which can be, for example, business, strategic, and technical objectives) of the mobile network operator have to be manually transformed into configuration values and/or policies for the SON Functions such that the SON Functions operate according to these operator objectives.

A SON Function can be configured by means of SON Function Configuration Parameters (SCP). Depending on SCP Values (SCV), the behavior of the SON Function may change, such that the SON Function may adjust NCPs differently, whereby the network KPIs may change as a consequence. SCPs may include, for example, a step size in which the SON Function is allowed to modify an NCP, the range within which an NCP can be modified, or thresholds for the activation and deactivation of the SON Function. A certain SCV Set, i.e., SCVs for all SCPs, which a SON Function may comprise, may therefore modify the SON Function behavior in such a way that the SON Function may drive the network KPIs towards a certain optimization target, which may depend on the operational context. For example, a Mobility Load Balancing (MLB) function may be configured in such a way that it may optimize the network primarily towards a reduced number of call drops, or in such a way that it may optimize the network towards a balanced load between neighboring radio base stations. Such SCV Sets may be provided by the SON Function manufacturer. However, often only operator, project or manufacturer specific SCV Sets may be used, which may be afterwards not changed during operation.

In a technical view, there may be usually two possibilities to configure a SON-Function, depending on the SON system. Firstly, an SCV Set can be directly deployed to each SON-Function and thereby, configures the SON function. Secondly, the SON-Function can be configured with a SCV Policy. A SCV Policy may be understood as a set of rules which configure the SON-Function with a SCV Set depending on one or more conditions, e.g., network status or time. In this context, the term "SCV Set" may be understood to include both options, except it is explicitly stated otherwise.

From the perspective of a mobile network operator, the SON Functions are a technical means to fulfill business, strategic, or technical objectives. In the following these are denominated as operator objectives. Operator objectives may include for example increasing end-user satisfaction, increasing network capacity and coverage, reducing energy consumption and/or reducing operational cost. These operator objectives may have different priorities in general, but may also be depending on a location of a user, a user type and/or a current time of the day.

Thereby, priorities may indicate the importance of an objective to the operator. This importance can be expressed through, e.g., a ranking of the objectives (indicating an order in which the objectives need to be satisfied) or a weighting of the objectives (enabling a trade-off between the degree of satisfaction of different objectives).

The primary aim of mobile network operations may be not the optimization of dedicated single network KPIs, which may be understood as the actual task of the SON Functions, but the fulfillment of operator objectives. Examples for changes in the objectives of an operator may include a change in objective priorities regarding the user requirements, a change in a network state, and/or a time of the day, since in the night less traffic may occur compared to daytime.

However, by using default SCV Sets provided by the SON Function manufacturer and used afterwards by an operator, one or more changes in these objectives is almost impossible to be implemented automatically in the network. One reason may be that a change of an objective may require a modification of the SCVs to adapt the SON Function behavior according to the changed objectives. Thus, a required adaptation of the network behavior may be almost impossible under these conditions.

An adaptation of one or more SON Functions has to be done manually in current implementations leading the SON goal to relieve a human operator from manual tasks ad absurdum.

Moreover, SON Functions may be delivered as a "black box" by the manufacturer, i.e., the operator has no or only few information about the objective or (utility) function, or insight to the actual SON Function algorithm. This may prevent an adaptation, for example a mathematical optimization, of the SCVs of the SON Function, or its integration into a common utility function with all other SON Functions and, may even complicate a manual adaptation of SCVs.

Closing the manual gap between operator objectives on the one side, and SCV Sets on the other side, as proposed according to the present invention, may be an advantage for enabling operator objective-driven SON and network operation. It may be of advantage to link the SCV Sets with the operator objectives in such way that the SON Functions fulfill these operator objectives, and changes in the objectives may quickly influence the network behavior.

In current systems there is neither an entity available that can manage this link between SCV Sets and operator objectives, nor are methods available to perform this mapping in an automated way. In addition, standard interfaces providing the necessary information about the SON Functions (SON Function model) and the operator objectives are missing. To some extent this also applies to the interface towards the SON Functions, through which the results of the mapping, SCV Sets, can be provided. Existing configuration management interfaces barely provide sufficient capabilities, and existing 3GPP standards for policy provisioning may only allow a very reduced number of SON Function specific policies.

Presently, an approach that starts at objectives and uses them to adapt SON Functions, i.e., a method to overcome the manual gap between objectives and SCV Sets, is missing. This is the reason why SON Functions are executed with default parameter values. Thus, also approaches will be considered which do not go so far as to start at objectives.

The possibility to enable different constituencies to describe policies at different layers of abstraction, in a prototype implementation of the Policy Continuum may be one approach. The necessity of having different abstraction views, and a corresponding architecture, is described in principle in known approaches, but an automated approach to transform business policies (i.e., operator objectives) into low level policies (i.e., SCVs) is missing.

An automated approach with an arbitrary number of abstraction layers that deals with the automated transformation of abstract policies into low level policies that can be executed by SON Functions, already exits. However, this approach is not objective-driven. A main problem that may be solved with the present suggested approach according to the invention may be to overcome the gap between operator objectives and SCV Sets, which is not part of the known approaches, since these known approaches only provide a transformation between abstract policies and low level policies, but do not consider operator objectives, which makes transformations considerably easier. Concretely, these approaches transform abstract Event-Condition-Action rules (policies) into low-level Event-Condition-Action rules (policies).

Moreover, a policy based framework may be present that combines different approaches. There may be defined for example three layers on which policies can be described at different degrees of abstraction and a refinement process that transforms higher-layer policies into policies of the subsequent layer. However, this transformation starts with abstract policies and does not consider operator objectives.

Another approach may be a policy refinement approach. This approach provides a mapping of low-level objectives to specific operations in order to achieve a predefined goal by using a model checker. Disadvantages of this approach are, that a detailed system description is needed in order to be able to execute transformations in an automated way and that operations are constant for given goals, i.e., it may be not possible to define priorities for objectives.

FIG. 2 shows an exemplary embodiment of a functional architecture of SON Management according to the present invention with the function and interfaces of the SON Objective Manager, that provides methods and interfaces to automatically interconnect the operator objectives (for example, business, strategic and technical objectives) of the mobile network operator with the model descriptions of the SON functions deployed in the network, such that as the outcome of this interconnection process SCV Sets (which are, for example, configuration values and/or policies) for the SON Functions are generated that configure the SON Functions in such way that the operator objectives are met by the SON system.

In FIG. 2 a proposed functional architecture of SON Management including the SON Objective Manager is shown as an exemplary aspect of the present invention. The SON Objective Manager itself is depicted as a rectangular box. The interfaces of the SON Objective Manager (which are explained in detail below) are depicted as pentagonal boxes. The data serving as input to the SON Objective Manager (Operator Objectives and SON Function Models), as well as the data provided as output by the SON Objective Manager (SCV Sets or Policies), are depicted as round-edge rectangular boxes. Furthermore, FIG. 2 shows two exemplary SON Functions which are also depicted as rectangular boxes. The SCPs of these SON Functions are depicted as circles. The arrows in FIG. 2 depict the data flow between the components of the SON Management.

Features of the SON Management architecture that are introduced by the present approach are for example:

The SON Function Model Interface may define the access to a machine understandable model of the behavior of each SON Function. Hence, the interface may provide access to information about how different SCV Sets of a specific SON Function satisfy possible operator objectives. The SON Function model that is accessed through the interface may be usually provided by the vendor of the SON Function. In order to enable the usage of SON Functions from different vendors, the SON Function Model Interface may be standardized in such a way that the SON Objective Manager can configure SON Functions from different vendors.

The Operator Objective Interface may define a standardized syntax for the description of operator objectives. The description of the operator objectives may be thereby coherent with the description of the operator objectives in the SON Function Model Interface, to enable the mapping between the objectives and the model. Therefore, also the Operator Objective Interface may be standardized to ensure multi-vendor capabilities of the SON Objective Manager.

The SON Objective Manager may take the operator objectives and the technical description of each SON Function, may perform a reasoning process, and may determine a SCV Set for each SON Function. Since the SON Function Model Interface could also be standardized, thus the SON Objective Manager may create SCV Sets for SON Functions from different vendors. This may facilitate a high-level integration of multi-vendor SON Functions controlled by common operator objectives.

The SON Function Interface may describe the interconnection between the SON Objective Manager and the SON Functions. The SCV Sets as created by the SON Objective Manager may be provided to the SON Functions. Depending on the implementation the SCV Sets may comprise dedicated configuration settings for the SON Function, or may comprise of a policy. Furthermore, depending on the implementation of the SON Objective Manager, the SON Function Interface may be standardized.

The present approach may allow to automatically adjusting the SCV Sets of the SON Functions based on the operator objectives. This objective-driven control of the behavior of the SON Functions may otherwise not be possible and would therefore require manual effort.

Components used for the present approach, for example a SON Function Model Interface, an Operator Objective Interface, the SON Objective Manager, and a SON Function Interface, may be implemented in different ways. In the following, some possibilities are presented.

SON Function Model Interface

In order to allow the integration of SON Functions by different vendors, the SON Function Model Interface between the SON Objective Manager and the SON Function Model may be standardized. As a result, the SON Objective Manager may utilize SON Functions by different vendors. On an abstract level, the interface may provide information that may allow the SON Objective Manager to determine
- an SCV Set for each SON-Function which satisfies a set of prioritized operator objectives, optionally under some operational condition, and
- optionally, depending on the implementation of the SON Objective Manager, the set of all operational conditions that are relevant for the evaluation of the SCV.

This may be fulfilled by numerous concrete implementations of the interface. In the following, some examples are given:
- The interface can be implemented such that the SON Objective Manager can read the SON Function technical model as a set of concrete SCV Sets, each mapped to the operator objectives it fulfils and the conditions under which it is applicable. In order to select an SCV Set for a SON Function given a prioritized set of objectives and a set of network conditions, the SON Objective Manager can perform the following: first, it filters out all SCV Sets that are not applicable under the condition. Second, it considers the objective with the highest priority and selects the fulfilling SCV Sets. As an alternative explanation, in case the priorities represent ranks, it considers the objective with the highest rank and selects the fulfilling SCV Sets. Then, this step is continued for the resulting set with the second most important objective. The process stops when either the set of selected SCV Sets is a singleton, or all objectives have been considered and the final SCV Set is taken from the set at random. In case the priorities represent weights, the SON Objective Manager may select the SCV Set with the highest weighted satisfaction of all objectives. It should be noticed that it may also be possible to implement some constraint optimization approach for solving this selection problem. In order to determine the set of all conditions, the SON Objective Manager can iterate over all conditioned SCV Sets and collect the conditions.
- The interface can be implemented such that the SON Objective Manager can read the SON Function technical model as a set of utility functions, each mapping SCV to a utility regarding an objective and a condition. This utility represents the degree to which the SCV satisfies the objective. In this case, the SON Objective Manager can determine the best SCV Set for a prioritized set of objectives under some condition with, e.g., a mathematical linear optimizer. In order to determine the set of all conditions, the SON objective Manager can analyze the utility functions and compute all tipping points, i.e., the conditions under which the SCV Set would change.

In order to enable the SON Objective Manager to evaluate the SCV Sets from the SON Function Model Interface regarding the objectives from the Operator Objective Interface and the optional conditions, it may be of advantage that the exchanged objectives and conditions can be matched. Hence, it is not sufficient to solely standardize the interface structure for multi-vendor operation, but also standardize the mapping of the objectives as well as conditions. Three possible approaches for accomplishing that are:
- Standardizing all possible concrete objectives or conditions for all operators and SON Function vendors.
- Standardizing a mapping approach for matching the objectives or conditions of different operators and SON Function vendors, e.g., by using an ontology. This mapping can be provided as an additional service offering by the SON Function vendor. Thereby, the vendor creates a mapping between the vendor-specific objectives or conditions of the SON Function technical model and the operator objectives or conditions.
- A combination of the two approaches mentioned above.

Operator Objective Interface

The interface to the operator objectives may provide information that allows the SON Objective Manager to determine
- a set of prioritized operator objectives that may need to be satisfied, optionally under some operational condition, and/or
- optionally, depending on the implementation of the SON Objective Manager, the set of all operational conditions that are relevant for the evaluation of the operator objectives.

This requirement can be fulfilled by numerous concrete implementations of the interface. In the following, some examples are presented:
- The interface can be implemented such that the SON Objective Manager can read the operator objectives as a set of concrete objectives and their priority, each mapped to the conditions under which it may need to be satisfied. In order to determine the set of all conditions, the SON Objective Manager can iterate over all conditioned objectives and collect the conditions.
- The interface can be implemented such that the SON Objective Manager can read the operator objectives as a set of utility functions, each mapping a specific objective to a utility regarding some condition. This utility represents the priority of the objective. In order to determine the set of all conditions, the SON Objective Manager can analyse the utility functions and compute all tipping points, i.e., the conditions under which the objectives would change.

In order to enable the SON Objective Manager to evaluate the SCV Sets from the SON Function Model Interface regarding the objectives from the Operator Objective Interface and the conditions, it may be of advantage that the exchanged objectives and conditions can be matched. Hence, both should be standardized as outlined before.

SON Objective Manager

The SON Objective Manager performs a reasoning process for the best SCV Set for each SON Function regarding the operator objectives. Depending on the management system for the SON, it can be implemented in different ways:

According to a first option there may be a design-time implementation of the SON Objective Manager, i.e., SCV Sets are determined before instantiation of SON-Functions.

According to a second option there may be a run-time implementation of the SON Objective Manager, i.e., SCV Sets are determined after instantiation of the SON-Functions It should be understood, that the terms "first" and "second" are not used to use them in a hierarchical way, rather they are used to provide a first and a second alternative without any ranking.

Figure 3:
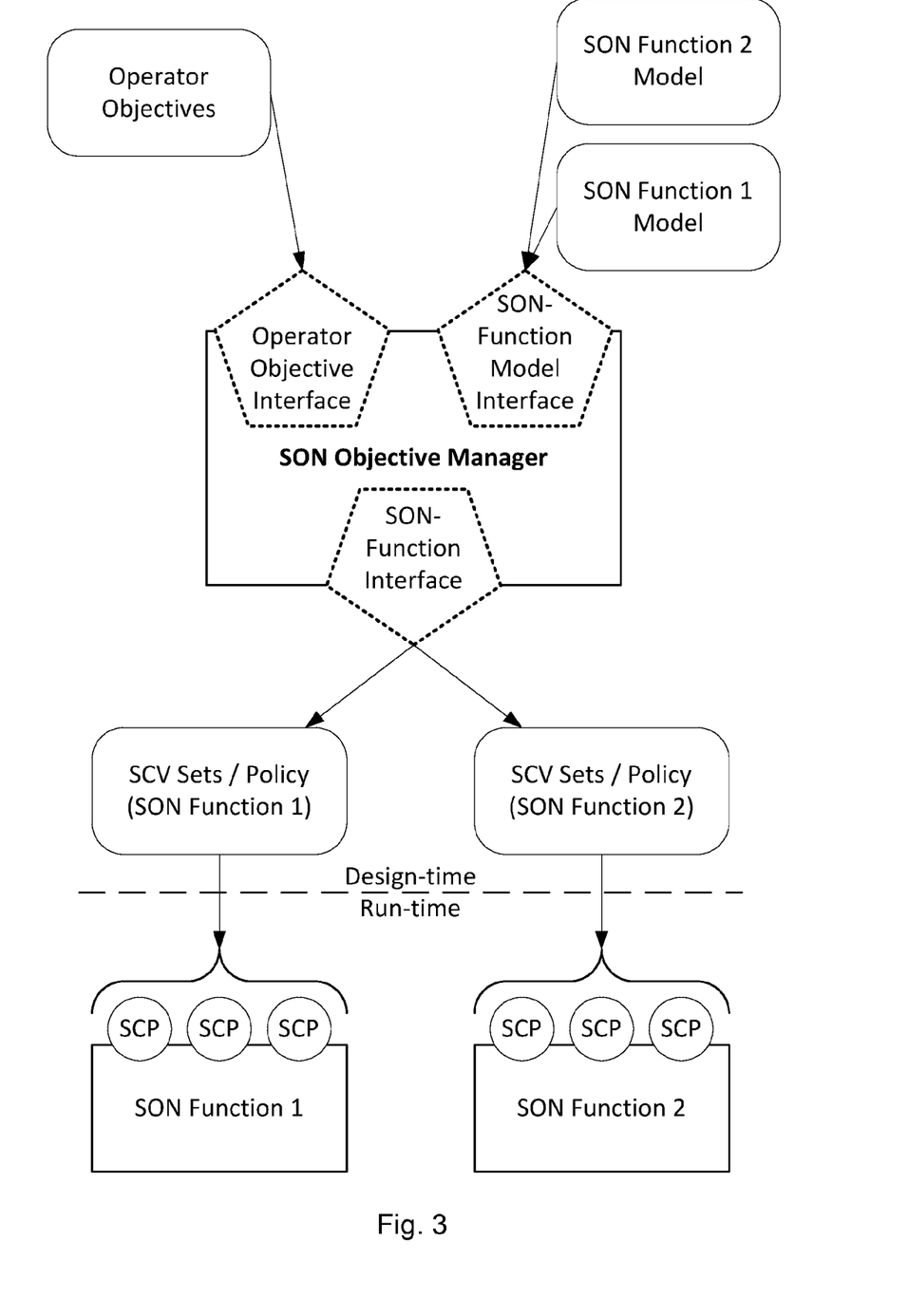
FIG. 3: an exemplary embodiment of an implementation according to a first Option comprising a Design-Time SON Objective Manager Functional Architecture.

Option 1:

FIG. 3 shows an exemplary embodiment of a functional architecture for a first possible implementation of the SON Objective Manager according to Option 1, in particular, the separation between the functions executed during the design-time of the SON system, and the functions executed during the run-time of the SON system.

A functional architecture for Option 1 is depicted in FIG. 3, which shows the same basic architecture of SON Management as it is depicted in FIG. 2, but with the information added at which time within the SON Management process the functions may operate. In this first option the SON Objective Manager may determine SCV Sets at design-time, i.e., prior to the actual operation or instantiation of the SON Functions. These SCV Sets are then used at run-time, i.e., after the SON Functions have been instantiated or have become operational, to configure the SON Functions based on the current operational condition. This approach implicates an excellent run-time performance, since SCV Sets are determined at design-time, and no calculation of the SCV sets is required during the instantiation of the SON Functions. However, it is also inflexible since it is not able to react on changing objectives during run-time of the SON Functions, which required adapting or re-computing the respective SCV Sets of the SON Functions. Instead, SCV Sets have to be recalculated frequently (which may be done when objectives change, or SON Function models change) which causes an increasing complexity at design-time. Furthermore, this approach implies existence of knowledge about all occurring system states already at design-time.

Figure 4:
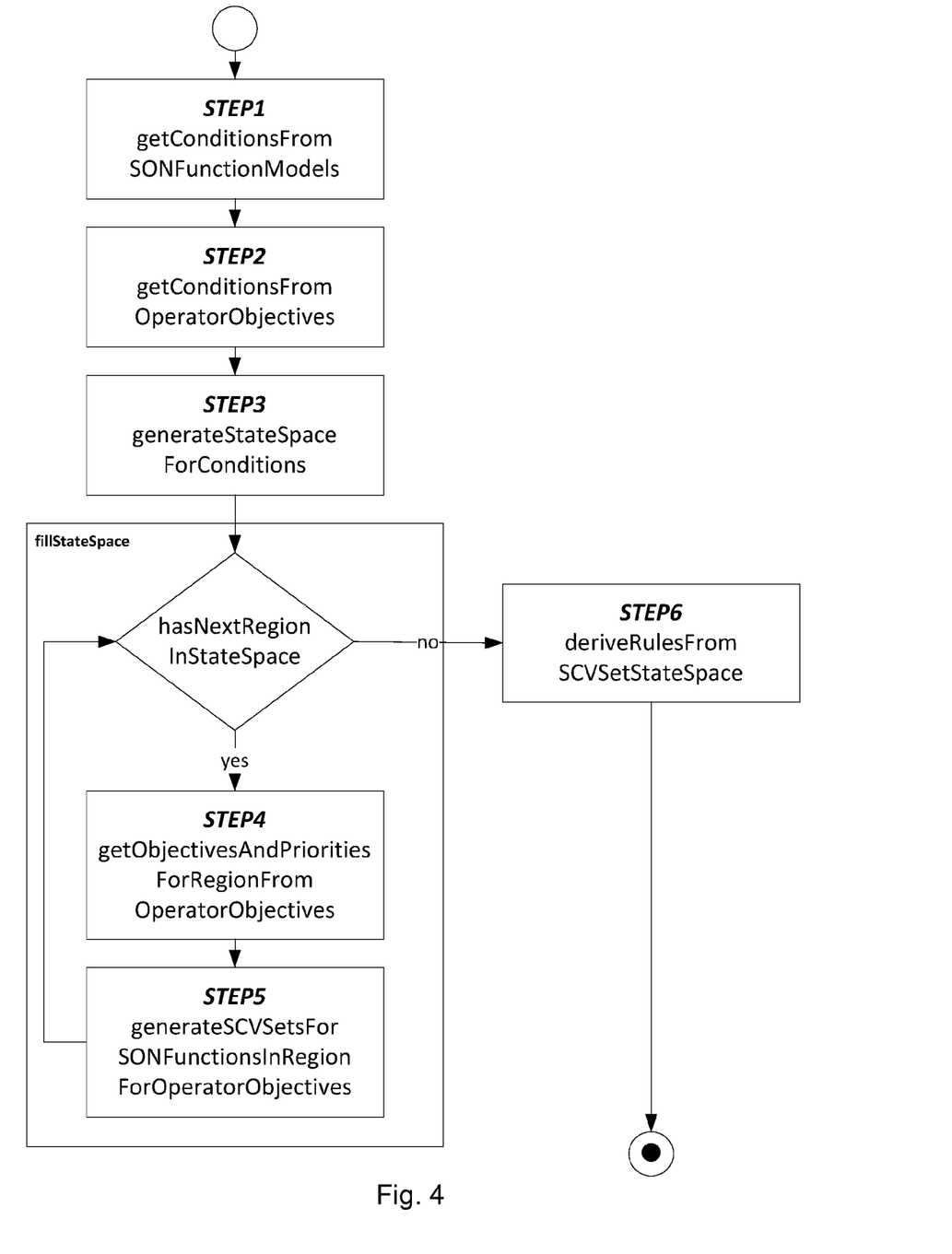
FIG. 4: an exemplary embodiment of an implementation according to the first Option comprising a Design-Time SON Objective Manager Process Flow.

FIG. 4: shows an exemplary embodiment of a process flow for the first implementation according to option 1 of the SON Objective Manager, in particular, different process steps which may be performed to acquire the necessary input information for the SON Objective Manager, exemplary process steps performed within the SON Objective Manager to determine the SCV Sets (which are, for example, configuration values and/or policies) for the SON Functions, and exemplary process steps to deploy the SCV Sets to the SON Functions.

For the first implementation option the process flow is depicted in FIG. 4. All conditions in the SON Function model have to be collected via the SON Function Model Interface (STEP1: getConditionsFromSONFunctionModels), and all conditions contained in the operator objectives have to be collected via the Operator Objectives Interface (STEP2: getConditionsFromOperatorObjectives). Based on this data a StateSpace is generated (STEP3: generateStateSpaceForConditions), in order to determine relevant system state regions where the SCV Sets or objectives might change.

Pursuant to these conditions, objectives provided with priorities are acquired from the Operator Objective Interface, and are then allocated to a region of the state space (STEP4: getObjectivesAndPrioritiesForRegionsFromOperatorObjectives). In the next step SCV Sets for SON-Functions in this region are generated by using information acquired from the SON Function Model interface and the respective operator objectives (STEP5: generateSCVSetsForSONFunctionsInRegionForOperatorObjectives). For STEP5, a constraint optimizer may be of advantage to determine the best or most suitable SCV Sets according to prioritized objectives. STEP4 and STEP5 may be repeated until SCV Sets are determined for each SON Function of each region of the state space. It is possible that there are only empty conditions in the state space, in this case only one region is built in the state space, and STEP4 and STEP5 are only executed once.

As the final step (STEP6: deriveRulesFromSCVSetStateSpace), the SON Objective Manager derives SCV Policies or, in case of empty conditions, SCV Sets for this single region from the state space.

Figure 5:
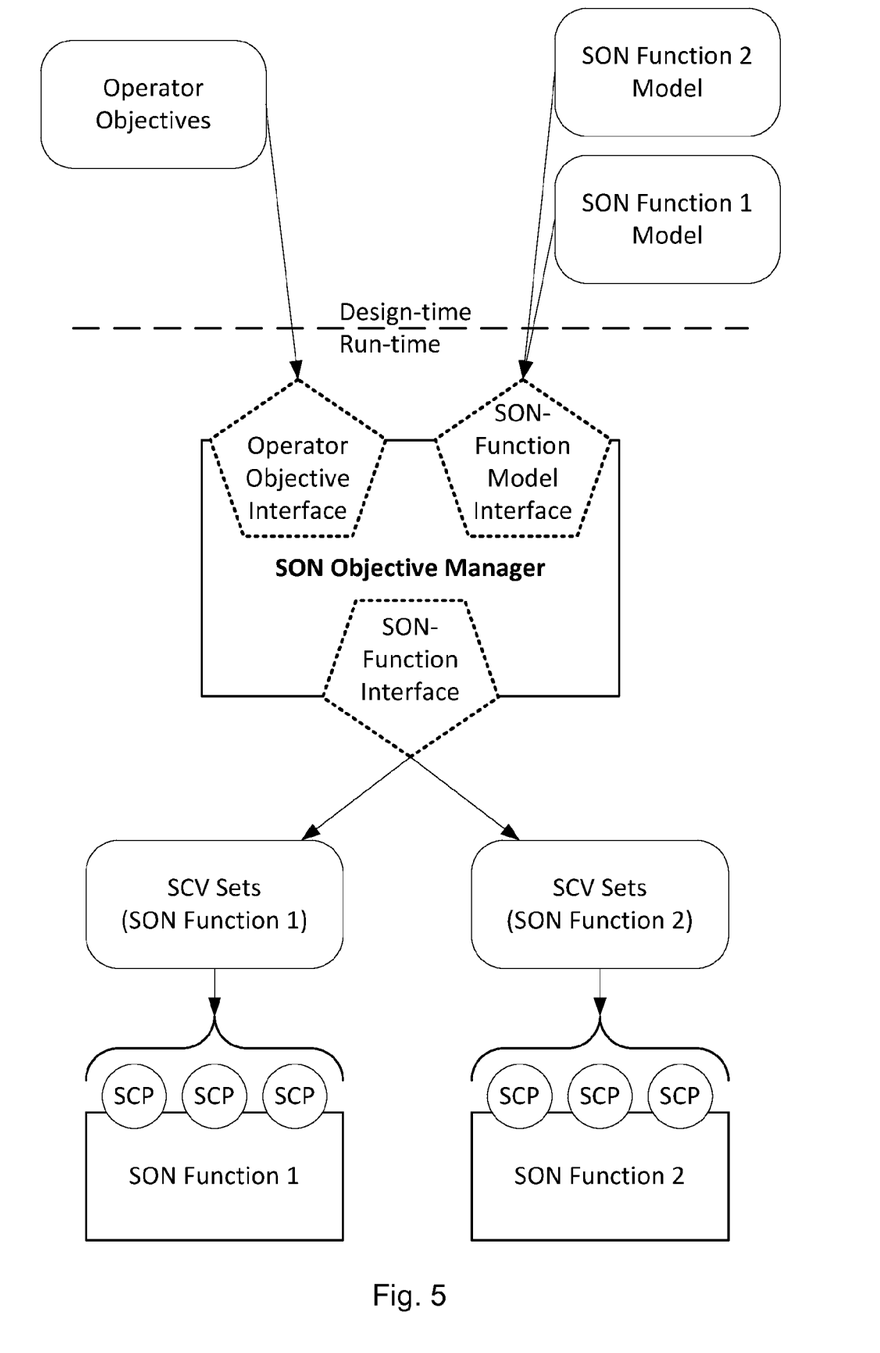
FIG. 5: an exemplary embodiment of an implementation according to a second Option comprising a Run-time SON Objective Manager Functional Architecture.

Option 2:

FIG. 5 shows a functional architecture for a second option of implementation of the SON Objective Manager, in particular, the separation between the functions executed during the design-time of the SON system, and the functions executed during the run-time of the SON system.

Figure 6:
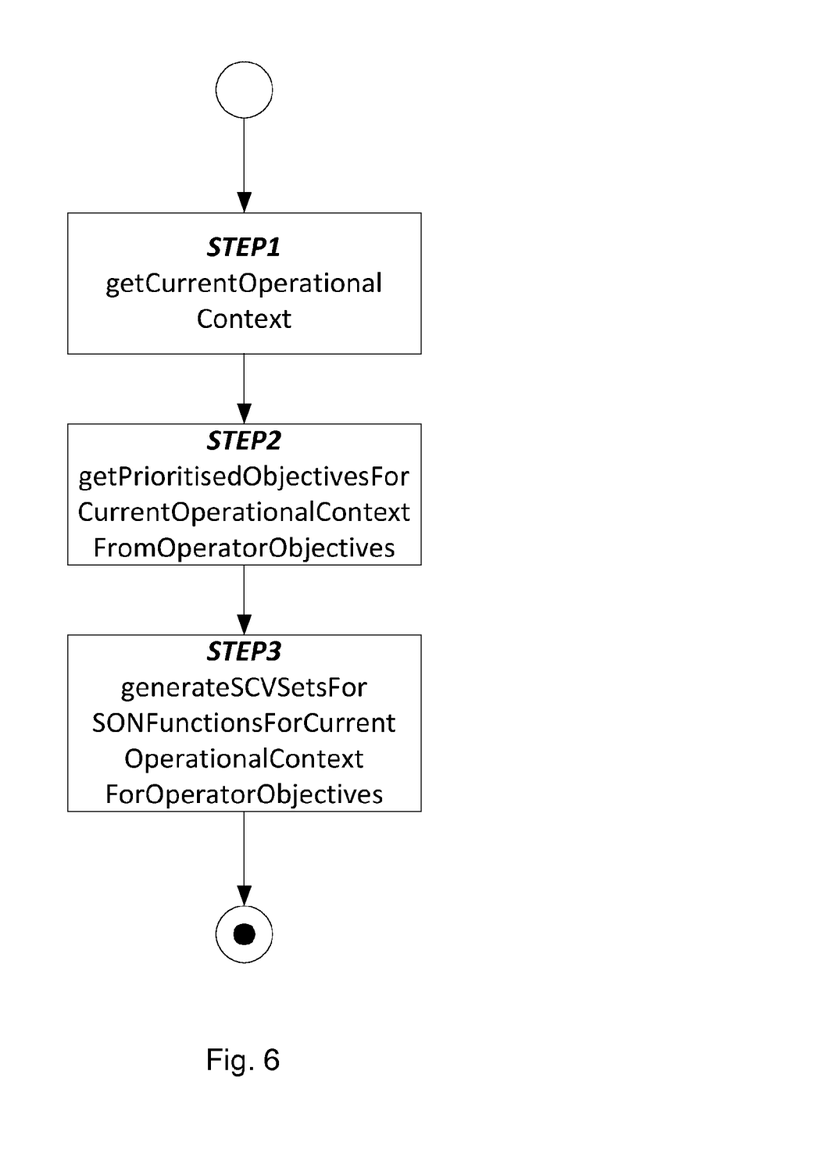
FIG. 6: an exemplary embodiment of an implementation according to the second Option comprising a Run-time SON Objective Manager Process Flow.

FIG. 6 shows an exemplary embodiment of a process flow for the second implementation option of the SON Objective Manager, in particular, different process steps provided to acquire the necessary input information for the SON Objective Manager, and the process step performed to determine and deploy the configuration values for the SON Functions.

The functional architecture for Option 2 is depicted in FIG. 5. This figure shows the same basic architecture of SON Management as it is depicted in FIG. 2, but with the information added at which time within the complete SON Management process the functions operate.

In contrast to Option 1 as described above, the SON system may be dynamically configured, i.e., during run-time of the SON Functions. Therefore, in Option 2, the SON Objective Manager may receive the operator objectives and the SON Function models during run-time, i.e., when the SON Functions have already been instantiated or have already become operational. In Option 2 the SON Objective Manager may determine the SCV Sets at run-time based on the current operational context, i.e., the most recent information is available regarding the operator objectives and the SON Function models. The advantage of this approach is its simplicity which is, however, paid with a more complex run-time reasoning may lead to an inferior run-time performance.

Option 2 can be described with a simpler process flow, see FIG. 6, since no state space may be computed as in Option 1 described above. The SON Objective Manager just may require the current operational context (STEP1: getCurrentOperationalContext) in order to get relevant objectives provided with priorities via the Operator Objective Interface (STEP2: getPrioritisedObjectivesForCurrentOperationalContextFromOperatorObjectives). After that, SCV Sets for all SON Functions can be determined according to prioritized operator objectives (STEP3: generateSCVSetsForSONFunctionForCurrentOperationalContextForOperatorObjectives) by using the SON Function Model Interface. In contrast to the Option 1, with a design-time SON Objective Manager, no policies are derived within the SCV Sets, since the conditions are already taken into consideration by the SON Objective Manager.

SON Function Interface

The SON Function Interface may comprise added functionalities compared to existing configuration management or SON Function configuration interfaces, which can either be vendor proprietary or (partially) standardized, for example in 3GPP. In case the SON Objective Manager is implemented at Network Management level, the SON Function Interface may be implemented for example via the 3GPP Itf-N interface. To enable the features according to the present approach, 3GPP standardization may be used, in particular to enable a standard description of SCV Sets. If the SON Objective Manager is implemented at Domain Management level, the SON Function Interface is within the proprietary vendor domain and standardization may be optional.

Example

In the following, possible implementations of the reasoning processes of the two SON Objective Manager options, i.e., the design-time and run-time option, are outlined for an exemplary scenario.

An exemplary scenario may take place around a simplified SON system with three SON-Functions: Mobility Load Balancing (MLB), Coverage and Capacity Optimization (CCO) and an Energy Savings (ES). For each of these SON-Functions there may be a SON-Function model which can be provide information about the mapping between operator objectives, an operational context, and SCV Sets. These models may be accessed via the SON-Function Model Interface. Possible SCV Sets per SON Function may be:

SCV SetMLB: cap (capacity optimization), not (no optimization)
SCV SetCCO: cap (capacity optimization), cov (coverage optimization), not (no optimization)
SCV SetES: es (energy savings), not (no energy savings)

The operator objectives may be conditional regarding two context parameters: first, the discrete parameter Location that may distinguish between two types of settlement density, i.e., "urban_area" and "rural_area", and, second, a continuous parameter Time. The operator objectives, which the SON Objective Manager may access via the Operator Objective Interface, may be defined as rules which may determine specific objectives depending on the context. These may be for example:
IF 08:00≤Time≤18:00 AND Location=urban_area THEN capacity WITH priority 1
IF 08:00≤Time≤18:00 THEN coverage WITH priority 2
IF Location=rural_area THEN save_energy WITH priority 3
IF 18:00≤Time≤24:00 OR 00:00≤Time≤08:00 THEN coverage WITH priority 4
IF 18:00≤Time≤24:00 OR 00:00≤Time≤08:00 THEN save_energy WITH priority 5

The IF-part specifies conditions under which the operator objectives, defined in the THEN-part, may be relevant. Thereby, the objectives may be prioritized according to the WITH-part. Specifically, the possible objectives in this example are capacity, coverage, and save_energy, whereas the priority are ranging in this example from 1 to 5 with decreasing importance.

Option 1 (Design-time SON Objective Manager)

First, the SON Objective Manager may create the state space from the conditions of the operator objectives. By analysing the above mentioned objectives and their conditions, the SON Objective Manager may determine the following relevant ranges for the context parameters in the state space as an example:
Location={"rural_area", "urban_area"}
Time={00:00-08:00, 08:00-18:00, 18:00-24:00}

For each range combination for the two parameters, called "region", the SON Objective Manager may determine the applicable objectives including their priorities. In the present scenario, this may be visualized as the two dimensional state space depicted in FIG. 7. For instance, it is considered a rural area between 0:00 o'clock and 08:00 o'clock. In this example, the three objectives "save_energy" with priority 3, "coverage" with priority 4, and "save_energy" with priority 5 are applicable according to the objectives of the operator.

Figure 7:
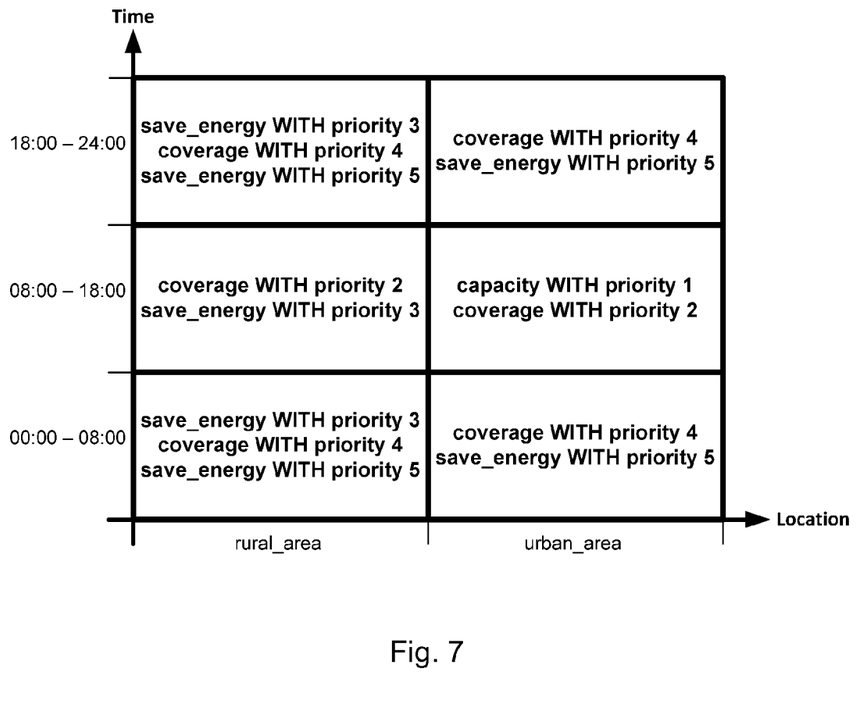
FIG. 7: an exemplary embodiment for a State Space with Operator Objectives and their priorities.

FIG. 7 shows an example of the State Space for the first implementation option, where this State Space comprises here only two dimensions: Time and Location. For each sector in the Time as well as in the Location dimensions, the objectives together with their priorities are illustrated. FIG. 7 reflects the content of the State Space after all iterations of STEP4 of FIG. 4 have been completed.

Figure 8:
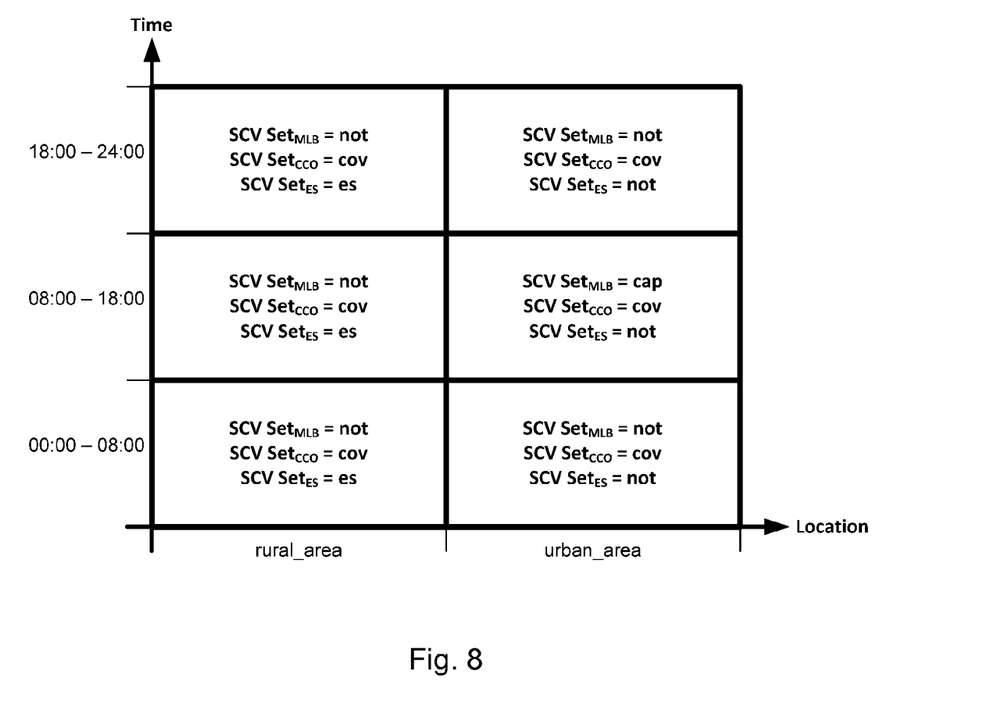
FIG. 8: an exemplary embodiment for a State Space with SCV Sets for each SON Function.

For each region in the state space, the SON Objective Manager may use the set of applicable operator objectives and the context condition range defined by the region in order to determine the most appropriate SCV Set for each SON Function. The necessary information, which can be evaluated using, e.g., one of the approaches described above, is provided via the SON Function Model Interface. The resulting state space with the SCV Sets is depicted in FIG. 8. For instance, it is considered a rural area between 0:00 o'clock and 08:00 o'clock. For this case, the SON Objective Manager may determine SCV SetMLB=not, SCV SetCCO=not, SCV SetES=es for the three objectives shown in FIG. 7.

FIG. 8 shows an example of the State Space for the first implementation option, where this State Space comprises here only two dimensions: Time and Location: For each sector in the Time as well as in the Location dimensions, the SCV Sets which can then be deployed to the SON Functions are shown. FIG. 8 reflects the content of the State Space after all iterations of STEPS of FIG. 4 have been completed.

From the state space with SCV Sets, the SON Objective Manager may derive a SCV Policy which may configure the SON Functions at run-time. This policy can for example look like:

Location=rural_area ˆ 00:00≤Time≤08:00

→SCV Set$_{MLB}$=not, SCV Set$_{CCO}$=cov, SCV Set$_{ES}$=es

Location=rural_area ˆ 08:00≤Time≤18:00

→SCV Set$_{MLB}$=not, SCV Set$_{CCO}$=cov, SCV Set$_{ES}$=es

Location=rural_area ˆ 18:00≤Time≤24:00

→SCV Set$_{MLB}$=not, SCV Set$_{CCO}$=cov, SCV Set$_{ES}$=es

Location=urban_area ˆ 00:00≤Time≤08:00

→SCV Set$_{MLB}$=not, SCV Set$_{CCO}$=cov, SCV Set$_{ES}$=not

Location=urban_area ˆ 08:00≤Time≤18:00

→SCV Set$_{MLB}$=cap, SCV Set$_{CCO}$=cov, SCV Set$_{ES}$=not

Location=urban_area ˆ 18:00≤Time≤24:00

→SCV Set$_{MLB}$=not, SCV Set$_{CCO}$=cov, SCV Set$_{ES}$=not

Option 2 (Run-time SON Objective Manager)

Different to Option 1, the implementation of Option 2 may perform run-time reasoning. Hence, after providing triggers by one or more external events, the SON Objective Manager may query for the current operational context. Using this, SON Objective Manager may use the Operator Objective Interface to determine the applicable objectives including their priorities for the current context. For instance, it is assumed that the time is 18:01 and the location to be configured is a rural_area. In this case for example the following objectives may be applicable:

save_energy WITH priority 3
coverage WITH priority 4
save_energy WITH priority 5

Next, the SON Objective Manager may determine the best or most suitable SCV Set for each SON Function for the current context and applicable operator objectives by using the SON Function Model Interface. Possible implementations of this reasoning process are outlined above. The result will be one SCV Set for each SON-Function, for example like:

SCV SetMLB=not, SCV SetCCO=cov, SCV SetES=es

These SCV Sets may be then deployed to the SON Functions.

Implementation in OAM Systems—Standardization Relevance

The SON Objective Manager may be understood as a central component within a SON-enabled mobile network and can be seen as a part of the Operation, Administration and Maintenance (OAM) System. However, there may be different options regarding the implementation, mainly with respect to the OAM system layer where the SON Objective Manager may be placed. Depending on the implementation option different requirements arise regarding a standardization of the Operator Objective Interface, the SON Function Model Interface, and the SON Function Interface.

Option A: the SON Objective Manager may be implemented at the vendor-specific domain management layer. In this case the SON Function Interface is within the vendor domain and may not needed to be standardized (on only in minor scale). The Operator Objective and the SON Function Model Interfaces, however, would be exposed via the 3GPP standardized Itf-N (3GPP Northbound) interface which interconnects domain and network management layers. The information provided via these two interfaces would therefore be of advantage in a standard format. For the SON Function Model description this may include, for example, SCV Sets and operational conditions. For the Operator Objectives this may include, for example, a standardized description of targets for user satisfaction, network throughput, network capacity etc., as input to the SON Objective Manager.

Option B: the SON Objective Manager may be implemented at the vendor-independent network management layer, i.e., "above" the 3GPP standardized Itf-N interface. In this case the SON Function Interface may be exposed via for example the Itf-N interface, which may require the information provided from the SON Objective Manager towards the SON Functions to be in a standard format, for example, the SCV Sets. Regarding the Operator Objective and the SON Function Model Interfaces the situation may be different. Since these may not be any more part of the 3GPP standardized domain, they may require to be multi-vendor capable—otherwise it would be rather difficult to provide the SON Function Models from SON Functions provided by different manufacturers to the SON Objective Manager. Furthermore, in order to be able to map SCV Sets to operator objectives, also the operator objectives may be provided in a standardized format. A possible forum for the standardization of this option could be, for example, the TeleManagement Forum.

Finally, it should be noted that the above-mentioned embodiments illustrate rather than limit the invention, and that those skilled in the art will be capable of designing many alternative embodiments without departing from the scope of the invention as defined by the appended claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

Furthermore, the network entities or network elements and their functions described herein may be implemented by software, e.g. by a computer program product for a computer, or by hardware. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

LIST OF ABBREVIATIONS

3GPP 3$^{rd}$ Generation Partnership Project
ECA Event-Condition-Action
Itf-N 3GPP OAM Northbound Interface
KPI Key Performance Indicator
LTE Long Term Evolution
MLB Mobility Load Balancing
NCP Network Configuration Parameter
OAM Operation, Administration and Maintenance
SCP SON-Function Configuration Parameter
SCV SON-Function Configuration Parameter Value
SON Self-Organising Networks

The invention claimed is:

1. A network entity installed in a network, comprising:
an operator objective interface for receiving one or more operator objectives; and
a self-organizing network (SON) function model interface for receiving at least a SON function model comprising at least one mapping of at least an objective or condition of at least one SON operator according to at least one ontology,
wherein the network entity is adapted to link the one or more operator objectives with the SON function model in order to adapt a SON function for influencing a network behavior.

2. The network entity according to claim 1, wherein the SON function model further comprises at least one SON function configuration parameter value (SCV) and at least one of the one or more operator objectives.

3. The network entity according to claim 1, wherein the one or more operator objectives are at least one of business policies, strategic policies, and technical policies, and comprise at least one possible condition and at least one priority.

4. The network entity according to claim 1, wherein the network entity is adapted to transform operator objectives into configuration values, configuration policies, or SON function configuration parameter value (SCV) sets that can be executed by the SON function.

5. The network entity according to claim 1, further comprising:
a SON function interface for connection with the SON function.

6. A method for automatically controlling at least one self-organizing network (SON) function, the method comprising:
receiving at least one SON function configuration parameter value (SCV) from a SON function model comprising the at least one SCV and at least one mapping of at least an objective or condition of at least one SON operator according to at least one ontology;
receiving at least one operator objective;
automatically mapping the at least one SCV with the at least one operator objective; and
providing one or more of one or more configuration values, one or more policies, and one or more SCV sets for the SON function to be executed by the SON function.

7. The method according to claim 6, the method further comprising:
receiving the at least one possible condition from the SON function model; and
automatically mapping the at least one SCV with the at least one operator objective based upon the at least one possible condition.

8. The method according to claim 6, the method further comprising:
receiving one or more possible conditions from the at least one operator objective; and
automatically mapping the at least one SCV with the at least one operator objective based upon the one or more possible conditions.

9. The method according to claim 6, the method further comprising:
receiving one or more priorities from the at least one operator objective; and
automatically mapping the at least one SCV with the at least one operator objective based upon one or more possible conditions, one or more priorities, or one or more possible conditions and priorities.

10. The method according to claim 6, the method further comprising:
generating the one or more SCV sets for the SON function.

11. The method according to claim 6, the method further comprising:
dynamically configuring the SON function.

12. The method according to claim 6, the method further comprising:
determining relevant system state regions where the one or more SCV sets or the one or more operator objectives have to be changed.

13. The method according to claim 6, the method further comprising:
utilizing the at least one operator objective to adapt at least one SON function configuration parameter (SCP) of the SON function.

14. The method according to claim 6, the method further comprising:
utilizing configuration data to adapt at least one SON function configuration parameter (SCP) of the SON function.

15. The method according to claim 6, the method further comprising:
utilizing policies to adapt the SON function.

16. A program element, which, when being executed by a processor, is adapted to control or carry out the method according to claim 6.

17. A computer-readable medium, in which a computer program is stored which, when being executed by a processor, is adapted to control or carry out the method according to claim 6.

* * * * *